United States Patent
Meyer et al.

(10) Patent No.: US 12,418,708 B2
(45) Date of Patent: Sep. 16, 2025

(54) CAMERA, A-PILLAR ARRANGEMENT, AND VEHICLE

(71) Applicant: Valeo Schalter und Sensoren GmbH, Bietigheim-Bissingen (DE)

(72) Inventors: Thorsten Meyer, Bietigheim-Bissingen (DE); Bernd Biehlman, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 159 days.

(21) Appl. No.: 18/022,030

(22) PCT Filed: Aug. 2, 2021

(86) PCT No.: PCT/EP2021/071522
§ 371 (c)(1),
(2) Date: Feb. 17, 2023

(87) PCT Pub. No.: WO2022/037926
PCT Pub. Date: Feb. 24, 2022

(65) Prior Publication Data
US 2023/0319381 A1    Oct. 5, 2023

(30) Foreign Application Priority Data
Aug. 19, 2020    (DE) .................... 10 2020 121 700 .5

(51) Int. Cl.
*H04N 23/54*        (2023.01)
*B60R 11/00*        (2006.01)
(Continued)

(52) U.S. Cl.
CPC ............. *H04N 23/54* (2023.01); *B60R 11/02* (2013.01); *H04N 7/183* (2013.01); *H04N 23/51* (2023.01);
(Continued)

(58) Field of Classification Search
CPC ........ H04N 23/54; H04N 7/183; H04N 23/51; H04N 23/57; B60R 11/02;
(Continued)

(56) References Cited

U.S. PATENT DOCUMENTS

| 10,093,234 B2* | 10/2018 | Ukeda | B60R 1/25 |
| 2002/0003571 A1* | 1/2002 | Schofield | B60R 1/04 |
| | | | 348/148 |

(Continued)

FOREIGN PATENT DOCUMENTS

| CN | 203681400 U | 7/2014 |
| CN | 203888721 U | 10/2014 |

(Continued)

OTHER PUBLICATIONS

International Search Report and Written Opinion in corresponding International Application No. PCT/EP2021/071522, mailed Dec. 21, 2021 (11 pages).

*Primary Examiner* — Christopher S Kelley
*Assistant Examiner* — Asmamaw G Tarko
(74) *Attorney, Agent, or Firm* — Osha Bergman Watanabe & Burton LLP

(57) ABSTRACT

Camera (3, 103, 203) for a vehicle (1), which camera is designed: to be mounted at least partially inside an A-pillar (7, 107, 207) of the vehicle (1), to record image data for an area in front of the vehicle (1), and to be arranged in the A-pillar (7, 107, 207) in such a way that a space (24, 124, 224) taken up by the camera (3, 103, 203) inside the A-pillar (7, 107, 207) has a smaller maximum dimension (A1, A3, A5) parallel to a line of sight (14, 114, 228) of the camera (3, 103, 203) than its maximum dimension (A2, A4, A6) parallel to a longitudinal direction (L) of the A-pillar (7, 107, 207).

13 Claims, 4 Drawing Sheets

(51) Int. Cl.
  *B60R 11/02* (2006.01)
  *G02B 27/00* (2006.01)
  *H04N 7/18* (2006.01)
  *H04N 23/51* (2023.01)

(52) U.S. Cl.
  CPC .............. *B60R 2011/0022* (2013.01); *B60R 2011/0043* (2013.01); *G02B 27/0006* (2013.01)

(58) Field of Classification Search
  CPC ..... B60R 2011/0022; B60R 2011/0043; B60R 2011/004; B60R 11/04; G02B 27/0006
  USPC .................................................. 348/148, 151
  See application file for complete search history.

(56) References Cited

U.S. PATENT DOCUMENTS

| | | | | | |
|---|---|---|---|---|---|
| 2004/0189862 | A1* | 9/2004 | Gustavsson | ....... | H01L 31/02325 257/E31.127 |
| 2007/0223899 | A1* | 9/2007 | Snow | ....... | G03B 17/08 396/25 |
| 2008/0151054 | A1* | 6/2008 | Kubota | ....... | B60R 1/25 348/148 |
| 2011/0227487 | A1* | 9/2011 | Nichol | ....... | G02B 6/0018 362/613 |
| 2014/0015977 | A1* | 1/2014 | Taylor | ....... | B60Q 1/2665 348/148 |
| 2016/0041386 | A1* | 2/2016 | Rodriguez Moreno | ....... | G06F 3/017 345/7 |
| 2016/0200254 | A1* | 7/2016 | Raab | ....... | H04N 23/698 348/148 |
| 2018/0072156 | A1 | 3/2018 | Tae et al. | | |
| 2019/0158765 | A1* | 5/2019 | Kuybeda | ....... | H04N 5/33 |
| 2021/0009141 | A1* | 1/2021 | Lu | ....... | B60W 50/14 |
| 2021/0150237 | A1* | 5/2021 | Woo | ....... | B60R 11/04 |
| 2022/0014650 | A1* | 1/2022 | Muramatsu | ....... | H04N 23/74 |
| 2022/0080829 | A1* | 3/2022 | Choi | ....... | G06T 7/292 |
| 2023/0087173 | A1* | 3/2023 | Fujii | ....... | C08F 236/06 525/71 |

FOREIGN PATENT DOCUMENTS

| | | | | |
|---|---|---|---|---|
| DE | 10340496 | A1 | 3/2005 | |
| DE | 102007054342 | B3 | 6/2009 | |
| EP | 1974998 | A1 | 10/2008 | |
| WO | WO-2005028256 | A2 * | 3/2005 | ............... B60R 1/00 |
| WO | WO-2018129310 | A1 * | 7/2018 | ............... B60R 1/00 |

\* cited by examiner

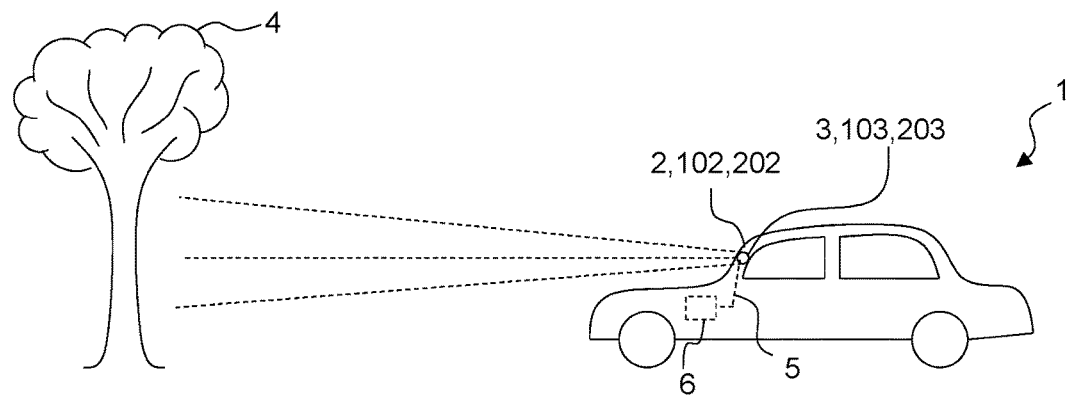
FIG. 1
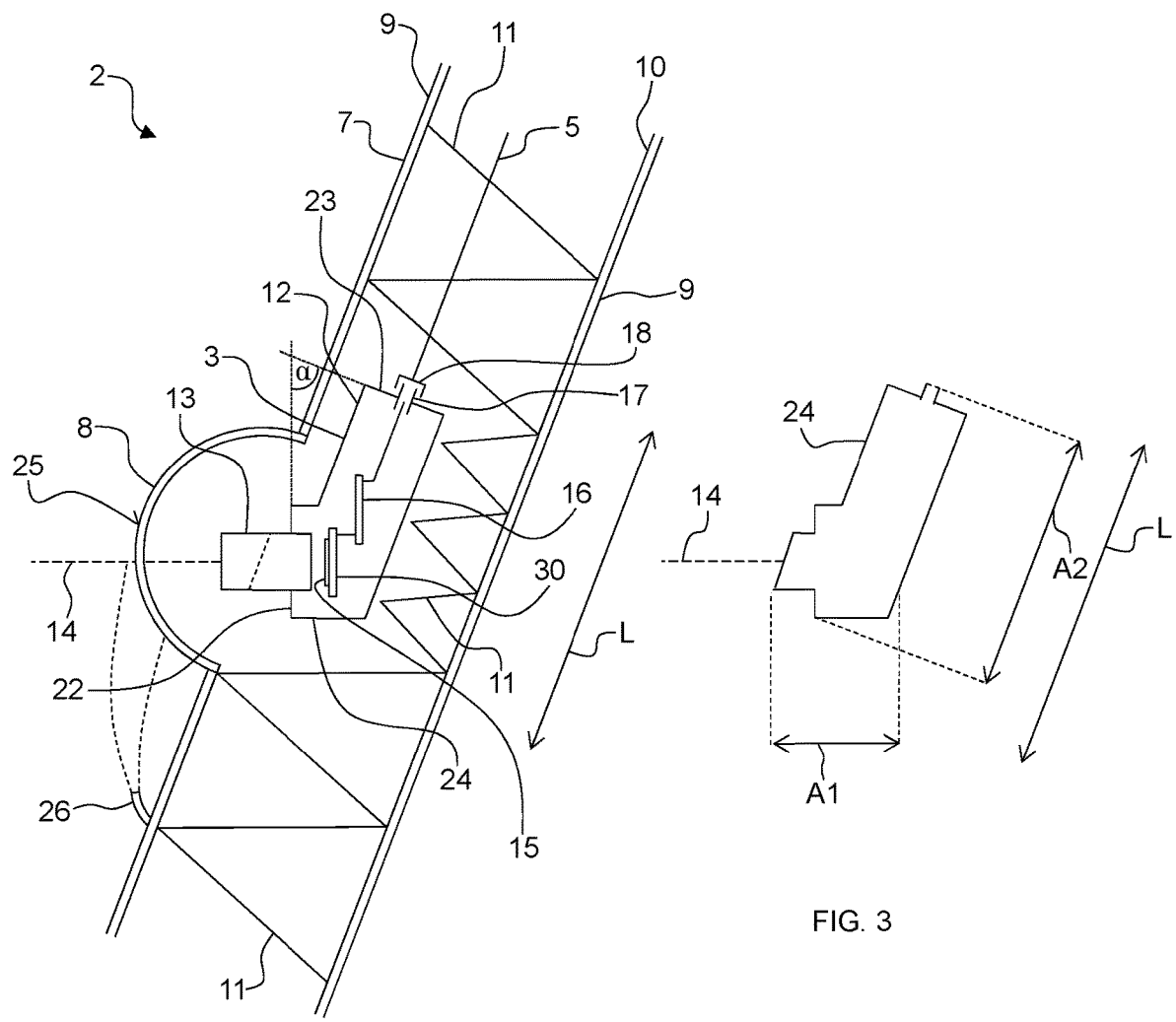
FIG. 2
FIG. 3

CAMERA, A-PILLAR ARRANGEMENT, AND VEHICLE

The present invention relates to a camera, an A-pillar arrangement having the camera, and a vehicle having the A-pillar arrangement.

Vehicles typically comprise a front camera installed in a front area of the vehicle to acquire objects in front of the vehicle. Such a front camera is typically attached in a top center position behind the windshield of the vehicle. Alternatively, a front camera can also be attached in a bottom center position on a radiator grill of the vehicle.

Attaching the front camera to a radiator grill of the vehicle is unsuitable for distance vision by means of the front camera, since the view can be concealed by nearby objects of low height. If the front camera is attached behind the windshield, images are recorded through the windshield. The image quality can be impaired in this case due to deficient optical quality of the windshield. For example, optical distortions can occur. In addition, a high reflection on the windshield and a low transmission through the windshield, in particular in the edge areas of the camera field of view, can reduce the image quality. Furthermore, image recording through those areas of the windshield which are not covered by a windshield wiper can be impaired due to soiling of the windshield.

Integrating a camera in the A-pillar of a vehicle to monitor an area concealed by the A-pillar is known from CN 203681400 U. However, mounting the camera in the A-pillar requires removing a part of the girder structure of the A-pillar to create space for the camera. This reduces the stability of the A-pillar and is therefore disadvantageous for reasons of occupant safety. Alternatively, the A-pillar can be made wider for mounting of a camera in the A-pillar of a vehicle. However, the area concealed by the A-pillar is thus enlarged, so that the field of view of the driver is more severely restricted.

Against this background, it is an object of the present invention to create an improved camera for an A-pillar of a vehicle, an A-pillar arrangement having the camera, and a vehicle having the A-pillar arrangement.

To achieve the object, according to a first aspect a camera for a vehicle is proposed. The camera is configured to be mounted at least partially inside an A-pillar of the vehicle and to record image data of an area in front of the vehicle. In addition, the camera is configured to be arranged in the A-pillar in such a way that a space occupied by the camera inside the A-pillar has a smaller maximum dimension in parallel to a line of sight of the camera than its maximum dimension is in parallel to a longitudinal direction of the A-pillar.

Because a space occupied by the camera inside the A-pillar has a smaller maximum dimension in parallel to a line of sight of the camera than its maximum dimension is in parallel to a longitudinal direction of the A-pillar, the camera in the A-pillar occupies a small space in relation to a cross section of the A-pillar. Therefore—in the cross-sectional view—only a small part of the girder structure of the camera has to be removed to create space for the camera. The A-pillar can thus be made narrow and simultaneously stable in spite of the integrated camera. With a narrow A-pillar, the vision concealment angle (blind spot) is advantageously small and the view of the driver is restricted relatively little by the A-pillar. A further advantage is that a stable A-pillar enables good occupant protection.

In addition, with the camera integrated in the A-pillar, an alternative arrangement of a front camera for monitoring the area located in front of the vehicle, in particular of the central area located in front of the vehicle, is created. Images of the surroundings—in contrast to the front camera arranged behind the windshield—are not recorded through the windshield here, which prevents unfavorable optical properties of the windshield from impairing the image quality.

The camera is configured to record image data of an area in front of the vehicle. The camera is configured, for example, to record image data of an area located centrally in front of the vehicle. In particular, the camera is configured to record images and/or videos of an area in front of the vehicle. The camera is in particular configured to monitor a monitoring area in front of the vehicle. In particular, stationary or moving objects in the front surroundings of the vehicle can be acquired, for example, vehicles, persons, animals, plants, obstacles, roadway irregularities (for example potholes or rocks), roadway boundaries, traffic signs, or free spaces (for example parking spaces).

The camera can be used, for example, for various driver assistance functions, for example, for a speed assistance (adaptive cruise control, distance control, ACC: adaptive cruise control), light assistance, high-beam assistance, lane assistance, lane keeping assistance (LKA: lane keep assist), lane change assistance, emergency braking assistance (AEB: automatic emergency braking), steering assistance, emergency steering assistance (AES: automatic emergency steering), traffic jam assistance (TJA: traffic jam assist), traffic jam pilot (TJP, traffic jam pilot), freeway assistance (HWA, Highway assist), and/or traffic jam pilot (TJP, traffic jam pilot).

The camera can be used, for example, for various driver assistance functions having an SAE automation level 1, 2, 3, 4, or 5. The camera can be used, for example, for driver assistance functions for autonomous driving or semiautonomous driving, wherein the vehicle is driven/controlled semi-automatically or fully automatically.

The SAE classification system, which is based on six different levels of automation, was published in 2014 by SAE International, a standardization organization for motor vehicles, as J3016, "Taxonomy and Definitions for Terms Related to On-Road Motor Vehicle Automated Driving Systems". It takes into account the level of system intervention and driver attention required. SAE automation levels range from level 0, which corresponds to a fully manual system, to level 5, which corresponds to a fully automatic system that eliminates the need for a driver. An autonomous vehicle (also known as a driverless car, self-driving car, and robotic car) is a vehicle capable of sensing its surroundings and navigating without human input, and conforms to SAE automation level 5.

The camera is in particular designed in such a way and configured to be arranged in the A-pillar in such a way that a space occupied by the camera inside the A-pillar has a smaller maximum dimension in parallel to a line of sight of the camera than its maximum dimension is in parallel to a longitudinal direction of the A-pillar.

For example, the camera is arranged completely inside the A-pillar of the vehicle. In this case, the space occupied by the camera inside the A-pillar is delimited by an external shape of the camera. Alternatively, the camera is arranged only partially inside the A-pillar. In this case, the space occupied by the camera inside the A-pillar is delimited by an external shape of the part of the camera located inside the A-pillar.

A line of sight of the camera is, for example, an optical axis of an objective of the camera. In a case in which the camera has a deflection device for deflecting a light beam incident from an object outside the vehicle toward the objective, a line of sight of the camera forms an angle in relation to the optical axis of the objective.

The vehicle is, for example, a passenger vehicle, a truck, and/or a bus. The camera can also be used in vehicles which can be operated autonomously or at least semi-autonomously.

The camera has an optical system, in particular an objective, a lens, or the like. The camera has, for example, a housing, an objective, and an image sensor arranged in the housing and in the beam path of the objective.

The camera is, for example, a high-resolution camera (high-definition camera (HD camera)).

Furthermore, the camera has a connecting element, for example. The connecting element is used, for example, for connecting the camera to a vehicle-side connecting element. The connecting element of the camera is, for example, a plug connector. The vehicle-side connecting element is, for example, a vehicle-side plug connector.

The camera is, for example, a so-called "satellite camera", which in its housing only has the imaging optical unit and the image sensor, but no image/video processor, no memory, and no control unit. The camera can thus be designed compactly. The image data of the images recorded by the camera are transmitted in this case via a data line from the camera to an image/video processor and/or memory arranged outside the camera (in particular outside the A-pillar). Furthermore, the camera is controlled via the data line by a control unit arranged outside the camera (in particular outside the A-pillar). The image/video processor arranged outside the camera, the memory arranged outside the camera, and/or the control unit arranged outside the camera are arranged, for example, in the vehicle, for example, in a central electronic control unit (ECU) of the vehicle. Alternatively, one, multiple, or all of these units can also be implemented in a cloud-based manner. In this case, the camera has as a connecting element, for example, a transmitter and/or receiver for wirelessly transmitting and receiving data (for example, RFID transceiver, radio-frequency identification).

The camera has, for example, one or more circuit boards. The image sensor is attached, for example, on a circuit board.

The A-pillar is a load-bearing vehicle pillar which connects the roof of the vehicle to the body substructure. The A-pillar is in particular a connecting strut between vehicle roof and body substructure. The A-pillar is a left or a right A-pillar of the vehicle. The vehicle in particular has two A-pillars, which are arranged on the left and right of the windshield viewed from the vehicle front. The A-pillar has, for example, surrounds for the windshield. Hinges of the driver and front passenger doors can also be fastened on the A-pillar.

The A-pillar is used, inter alia, for protecting the vehicle interior in case of an accident. In particular in the event of a side impact or a rollover of the vehicle, the A-pillar has the function of protecting the passenger compartment and thus the occupants. The A-pillar has a girder structure or a reinforcing structure for this purpose. For example, the A-pillar has a cavity, formed by a metal sheet, for example, in which a reinforcing structure is accommodated. The reinforcing structure is, for example, a reinforcing tube.

The A-pillar is, for example, arranged obliquely relative to a horizontal plane of the vehicle or a roadway plane in a side view of the vehicle. In particular, a longitudinal axis of the A-pillar is inclined in a side view in relation to the horizontal plane of the vehicle or the roadway plane. In particular, the A-pillar is inclined in such a way that an upper end of the A-pillar is located farther to the rear in a vehicle longitudinal direction than a lower end of the A-pillar.

According to one embodiment of the first aspect, the camera has a telephoto lens and is configured to record image data of a long range in front of the vehicle.

A long range in front of the vehicle can thus be monitored by means of the camera.

The telephoto lens has, for example, a focal length of 80 mm or greater, 135 mm or greater, 180 mm or greater, and/or 200 mm or greater.

According to a further embodiment of the first aspect, the camera has a housing, an objective, and a connecting element, which is attached to the housing and is configured for a connection of the camera to a vehicle-side connecting element. In addition, the camera is configured to be arranged in the A-pillar in such a way that a space occupied by the housing, the objective, and the connecting element inside the A-pillar has a smaller maximum dimension in parallel to the line of sight of the camera than its maximum dimension is in parallel to the longitudinal direction of the A-pillar.

In particular, the camera is designed in such a way and configured to be arranged in the A-pillar in such a way that a space occupied by the housing, the objective, and the connecting element inside the A-pillar has a smaller maximum dimension in parallel to the line of sight of the camera than its maximum dimension is in parallel to the longitudinal direction of the A-pillar.

The space occupied by the housing, the objective, and the connecting element inside the A-pillar relates to an external dimension of the housing, objective, and connecting element jointly. In other words, the space occupied by the housing, the objective, and the connecting element inside the A-pillar is related to an external envelope of these elements.

In the case in which the camera is arranged completely inside the A-pillar of the vehicle, the space occupied by the housing, the objective, and the connecting element inside the A-pillar is delimited by an enveloping shape which envelops the housing, the objective, and the connecting element jointly. In the case in which the camera is only arranged partially inside the A-pillar, the space occupied by the housing, the objective, and the connecting element inside the A-pillar is delimited by an enveloping shape which jointly envelops the parts of the housing, the objective, and the connecting element located inside the A-pillar.

According to a further embodiment of the first aspect, the camera is configured to be arranged in the A-pillar in such a way that an objective of the camera protrudes forward from the A-pillar in the vehicle direction.

That is to say, only a section of the camera is arranged inside the A-pillar, while the remaining section of the camera, in particular the objective or a section of the objective, protrudes forward from the A-pillar in the vehicle direction. The camera therefore occupies a smaller space inside the A-pillar. In particular, the camera occupies a smaller space in relation to a cross section of the A-pillar (a cross section perpendicular to the longitudinal direction of the A-pillar). The A-pillar can thus be made narrow and simultaneously stable in spite of the integrated camera.

According to a further embodiment of the first aspect, the camera has a housing and an objective which is arranged on a first housing wall. Furthermore, the camera has a connecting element for connecting the camera to a vehicle-side connecting element. The connecting element is arranged on a second housing wall, wherein the second housing wall forms an angle with the first housing wall.

A camera-side connecting element protruding partially out of the camera housing, a vehicle-side connecting element connected to a camera-side connecting element, and/or a cable outlet of the vehicle-side connecting element can be arranged favorably in the A-pillar, so that they only occupy a small space in relation to a cross section of the A-pillar.

In particular, the second housing wall of the camera housing is not parallel to the first housing wall. For example, the first housing wall is parallel to a vertical direction of the vehicle and/or perpendicular to an optical axis of the camera objective. For example, the second housing wall is perpendicular to a longitudinal axis of the A-pillar. For example, the second housing wall is perpendicular to the first housing wall.

According to a further embodiment of the first aspect, the camera has a housing and an objective. In addition, the camera has a first circuit board, which is arranged in the housing. Furthermore, the camera has an image sensor, which is attached to the first circuit board, wherein the main plane of extension of the first circuit board is arranged perpendicular to an optical axis of the objective and the image sensor is located in the beam path of the objective. Furthermore, the camera has a second circuit board, which is arranged in the housing and is electrically connected to the first circuit board, wherein the second circuit board is arranged behind the first circuit board with respect to the image sensor and offset upward relative to the optical axis of the objective in relation to the first circuit board.

Because the camera has a second circuit board, which is arranged behind the first circuit board having the image sensor, electronic components can also be arranged on the second circuit board. Moreover, the first circuit board having the image sensor is better protected from a position displacement, since the second circuit board is arranged between it and, for example, a plug connector for connection to a vehicle-side plug connector. A high position accuracy of the circuit board having the image sensor relative to the camera objective is important for the imaging quality in particular in the case of a high-resolution camera.

Because the second circuit board is arranged offset upward in relation to the first circuit board, a camera having a second circuit board can be used and nonetheless the space occupied by the camera inside the A-pillar can be kept small in relation to a cross section of the A-pillar.

According to a further embodiment of the first aspect, the camera is configured to be arranged in the A-pillar in such a way that an optical axis of an objective of the camera is aligned along a longitudinal direction of the A-pillar. In addition, the camera has a deflection mirror arranged in front of the objective, and the deflection mirror is configured to deflect a light beam incident from an object in front of the vehicle on the objective.

Because the camera, in particular the camera objective and its optical axis, is aligned along a longitudinal direction of the A-pillar and the camera has the deflection mirror, for example, a longer objective (for example, a telephoto lens) can be used and nonetheless the space occupied by the camera inside the A-pillar can be kept small in relation to a cross section of the A-pillar.

According to a further embodiment of the first aspect, the camera has a connecting element which is configured to be connected to a vehicle-side connecting element, in order to transmit image data recorded by the camera to an image processor arranged outside the camera, to store image data recorded by the camera on a memory arranged outside the camera, to receive control commands of a control unit arranged outside the camera, and/or to supply the camera with power.

Because an image/video processor, a memory, and/or a control unit for controlling the camera are arranged outside the camera and in particular outside the A-pillar, the camera can be kept compact and the space occupied by the camera inside the A-pillar can be kept small.

According to a second aspect, an A-pillar arrangement for vehicle is proposed. The A-pillar arrangement has an A-pillar and a camera as described above. Furthermore, the camera is designed and arranged in the A-pillar in such a way that a space occupied by the camera inside the A-pillar has a smaller maximum dimension in parallel to a line of sight of the camera than its maximum dimension is in parallel to a longitudinal direction of the A-pillar.

According to one embodiment of the second aspect, the A-pillar arrangement has a transparent cover, and the camera is configured to record images of an area in front of the vehicle through the transparent cover.

According to a further embodiment of the second aspect, the transparent cover has a low optical distortion.

Images of high quality can thus be recorded through the transparent cover. In particular in the case of a high-resolution camera, a good optical property of the transparent cover is advantageous.

In embodiments, the transparent cover has a high optical transmittance and/or a low reflectance.

In particular, an optical distortion and a reflectance of the transparent cover is lower and/or a transmittance of the transparent cover is higher than is the case in a conventional windshield.

According to a further embodiment of the second aspect, the transparent cover is domed.

A section of the camera, in particular a section of the objective, can thus protrude out of the A-pillar. Moreover, a shape of the transparent cover favorable from an aerodynamic aspect can be achieved.

According to a further embodiment of the second aspect, the transparent cover has an outer surface. Moreover, the A-pillar arrangement has a cleaning device for cleaning at least a part of the outer surface of the transparent cover.

Soiling on the transparent cover can thus be avoided and/or removed. A cleanliness of the transparent cover required for good image quality can thus be ensured.

According to a third aspect, a vehicle having at least one A-pillar arrangement as described above is proposed.

According to one embodiment of the third aspect, the vehicle has two A-pillar arrangements, wherein the cameras mounted inside the A-pillars each have a telephoto lens. In addition, the vehicle has a centrally mounted front camera having a normal objective or a wide-angle objective.

Because the vehicle has both the two narrow-angle cameras installed in the A-pillars and also the centrally mounted wide-angle or normal-angle camera, the surroundings in front of the vehicle can be monitored by means of three cameras, both in long range and in close range.

The centrally mounted wide-angle or normal-angle camera is, for example, a camera of moderate spatial resolution. It is mounted, for example, behind a windshield. The two narrow-angle cameras are, for example, high-resolution cameras.

The embodiments and features described for the proposed camera apply accordingly to the described A-pillar arrangement and the vehicle and vice versa.

The units mentioned here, such as the control unit, the image/video processor, and the memory, may each be implemented in hardware and/or software. In the case of a hardware implementation, the corresponding unit may be in the form of a device or in the form of part of a device, for example in the form of a computer or in the form of a microprocessor. Additionally, the one or more units, such as the control unit, the image/video processor, and the memory, may be implemented together in a single hardware device, and they may share a memory, interfaces and the like, for example.

The units, such as the control unit, the image/video processor, and the memory, may also be implemented in separate hardware components. In the case of a software implementation, the respective unit (such as the control unit, the image/video processor, and the memory) may be in the form of a computer program product, in the form of a function, in the form of a computation routine, in the form of an algorithm, in the form of part of a program code or in the form of an executable object.

A computer program product, such as a computer program means, can be provided or supplied as a storage medium, such as a memory card, USB stick, CD-ROM, DVD, or else in the form of a downloadable file from a server in a network. This may take place, for example, in a wireless communication network by transmitting a corresponding file containing the computer program product or the computer program means.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred embodiments with reference to the accompanying figures.

FIG. 1 shows a vehicle having an A-pillar arrangement;

FIG. 2 shows a partial cross-sectional view of a A-pillar arrangement of the vehicle from FIG. 1 according to a first embodiment;

FIG. 3 illustrates a space occupied by a camera inside an A-pillar of the A-pillar arrangement from FIG. 2;

Figures 4, 5:
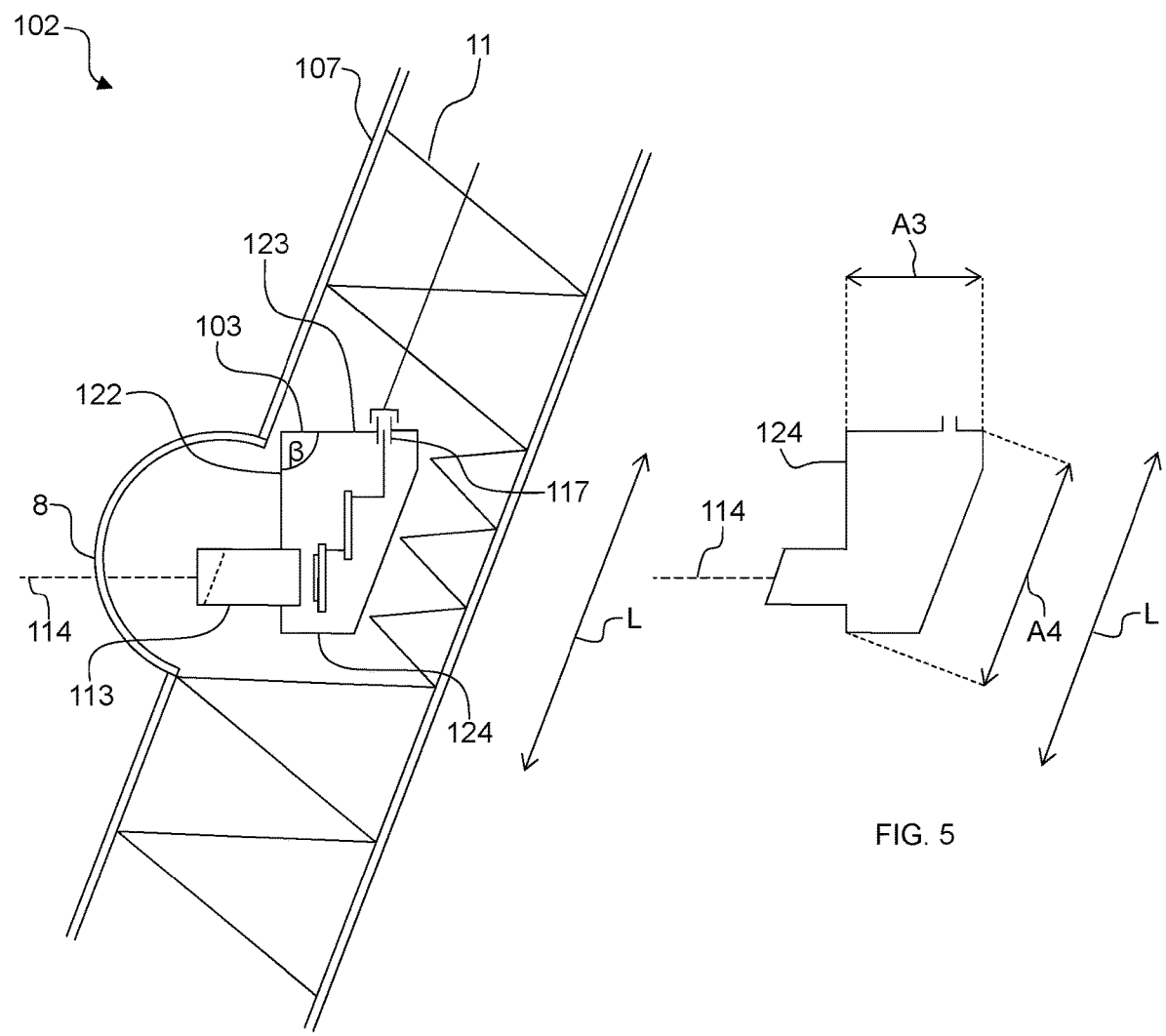
FIG. 4 shows a partial cross-sectional view of an A-pillar arrangement of the vehicle from FIG. 1 according to a second embodiment.
FIG. 5 illustrates a space occupied by a camera inside an A-pillar of the A-pillar arrangement from FIG. 4.

FIG. 1 shows a motor vehicle 1. The motor vehicle 1 is a passenger vehicle in the example. In other examples, the motor vehicle 1 can also be a truck, bus, or other motor vehicle. The motor vehicle 1 has two A-pillar arrangements 2, 102, 202. A camera 3, 103, 203 is integrated in each of the A-pillar arrangements 2, 102, 202. In the side view of FIG. 1, only the left A-pillar arrangement 2, 102, 202 from the driver's viewpoint having the camera 3, 103, 203 is visible. The cameras 3, 103, 203 are configured to monitor an area located in front of the vehicle 1. In the example of FIG. 1, the camera 3, 103, 203 acquires a tree 4 located in front of the vehicle 1 in the field of view of the camera 3, 103, 203. The cameras 3, 103, 203 are also configured, for example, to monitor an area located centrally in front of the vehicle 1.

The cameras 3, 103, 203 can be used, for example, for various driver assistance functions, for example, object recognition, lane keeping assistance, lane changing assistance, high-beam assistance, freeway assistance, and traffic jam pilot.

The camera 3, 103, 203 visible in FIG. 1 in the left A-pillar arrangement 2, 102, 202 from the driver's viewpoint is described hereinafter, wherein the camera can be designed the same way in the right A-pillar arrangement 2, 102, 202.

As shown in FIG. 1, the camera 3, 103, 203 is connected, for example, via a data line 5 to a control unit 6 of the vehicle 1. The control unit 6 is, for example, part of a central electronic control unit (ECU).

FIG. 2 shows an A-pillar arrangement 2 of the vehicle 1 from FIG. 1 according to a first embodiment. The A-pillar arrangement 2 has an A-pillar 7, a camera 3 mounted partially inside the A-pillar 7, and a transparent cover 8.

The A-pillar 7 has an outer structure 9. The outer structure 9 has, for example, correspondingly shaped metal sheets, which form a cavity 10. A girder structure 11 is arranged in the cavity 10. The girder structure provides the A-pillar 7 with stability, in order to protect the occupants from injuries, for example, in the case of an accident with side impact. The girder structure 11 is solely schematically shown in FIG. 2 and any known girder structure can be used as the girder structure 11.

The camera 3 has a housing 12. Furthermore, the camera 3 has an objective 13. Reference sign 14 designates an optical axis of the objective 13. The camera 3 additionally has a first circuit board 30 inside its housing 12. An image sensor 15 is attached to the first circuit board 30 facing toward the objective 13. The image sensor 15 is, for example, a CCD (charged coupled device) camera or a CMOS sensor. By way of example, the image sensor 15 is an active pixel sensor (CMOS-APS, CMOS active pixel sensor) produced using CMOS technology. The objective 13 is, for example, mechanically fixed to the first circuit board 30 by a lens holder (not shown), so that it is arranged in front of the image sensor 15.

The camera 3 has, for example, a second circuit board 16, which is electrically connected to the first circuit board 30. The second circuit board 16 is arranged behind the first circuit board 30 in relation to the image sensor 15. In addition, the second circuit board 16 is arranged offset upward relative to the first circuit board 30 (offset upward in relation to the optical axis 14).

Moreover, the camera 3 has a camera-side connecting element 17 for electrically connecting the camera 3 to a vehicle-side connecting element 18. The camera-side connecting element 17 and the vehicle-side connecting element 18 are each plug connectors, for example.

Figure 8:
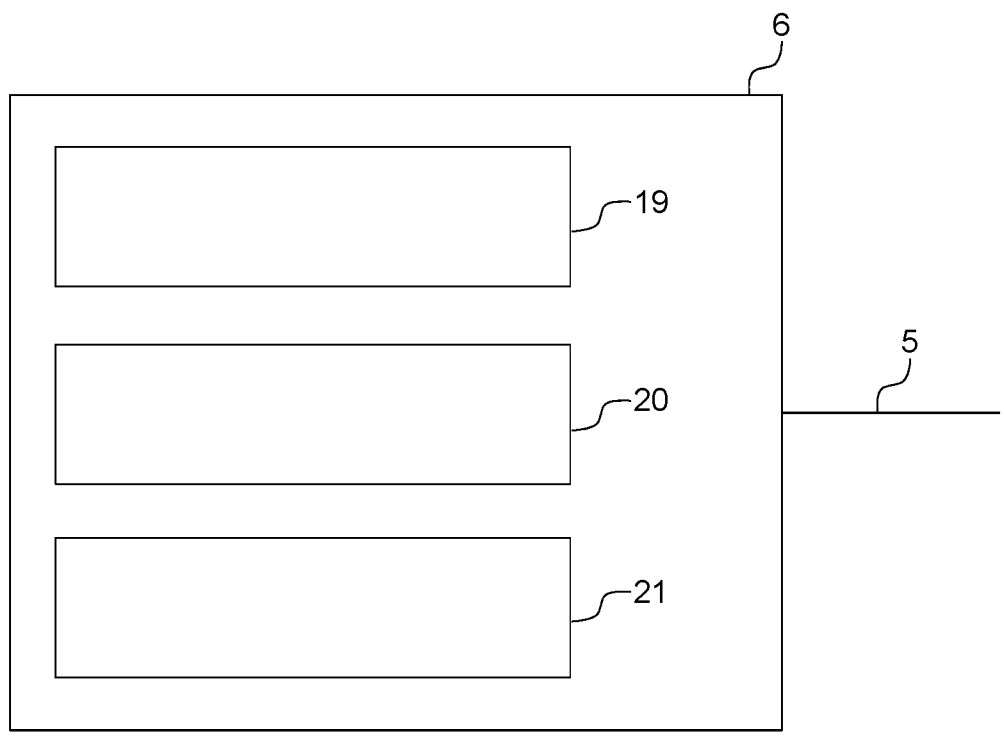
FIG. 8 shows a schematic representation of functional components of an electronic control unit of the vehicle from FIG. 1.

The camera 3 is, for example, a so-called "satellite camera", which only has the imaging optical unit (objective 13) and the image sensor 15 in its housing 12, but no image/video processor, memory, or control unit. The camera 3 can thus be made compact. The image data of the images recorded by the camera 3 are transmitted in this case via the data line 5 to an image/video processor 19 arranged outside the camera 3 and outside the A-pillar 7 and processed there (FIG. 8). In addition, the image data of the camera 3 are stored on a memory 20 arranged outside the camera 3 and outside the A-pillar 7. Furthermore, the camera 3 is controlled via the data line 5 by a control unit 21 arranged outside the camera 3 and outside the A-pillar 7. The external image/video processor 19, the external memory 20, and the external control unit 21 are arranged in the vehicle 1, for example, in the central electronic control unit 6 (FIG. 8) of the vehicle 1.

In the first embodiment shown in FIG. 2, the objective 13 is arranged on a first housing wall 22 of the camera 3 and the camera-side connecting element 17 is arranged on a second housing wall 23. The second housing wall 23 is inclined relative to the first housing wall 22, so that an angle α is formed between them. For example, the second housing wall 23 having the connecting element 17 is arranged perpendicularly to a longitudinal direction L of the A-pillar 7. A cable outlet from the camera 3 (connecting elements 17, 18, cable 5) can thus be produced along the longitudinal direction of the A-pillar 7.

Because the camera 3 is a "satellite camera", the second circuit board 16 is offset upward in relation to the first circuit board 30, and the cable outlet from the camera 3 is produced along the longitudinal direction L of the A-pillar 7, a space 24 occupied by the camera 3 inside the A-pillar 7 (FIGS. 2, 3) can have a smaller dimension A1 in parallel to a line of sight (the optical axis 14 here) of the camera 3 than its dimension A2 is in parallel to the longitudinal direction L of the A-pillar 7.

FIG. 3 shows this space 24 occupied by the camera 3 inside the A-pillar 7. The space 24 is defined by the enveloping shape of the camera-side connecting element 17, the camera housing 12, and that part of the objective 13 which is located inside the A-pillar 7.

Hollowing out of the girder structure 11 to install the camera 3 can be reduced by this advantageous design and arrangement of the camera 3 in the A-pillar 7. The A-pillar 7 thus remains stable in spite of integrated camera 3. In addition, widening of the A-pillar 7, which would result in a larger blind spot for the driver, is not necessary.

The transparent cover 8 of the A-pillar arrangement 2 is dome-shaped, as can be seen in FIG. 2. It is fastened on the outer structure 9 of the A-pillar 7. The transparent cover 8 has an outer surface 25, which can be cleaned by means of a cleaning device 26. The cleaning device 26 has, for example, one or more spray nozzles.

FIG. 4 shows an A-pillar arrangement 102 of the vehicle 1 from FIG. 1 according to a second embodiment. The A-pillar arrangement 102 of the second embodiment (FIGS. 4, 5) differs from the A-pillar arrangement 2 of the first embodiment (FIGS. 2, 3) due to a different arrangement of the first and second housing walls 122, 123. In the second embodiment, the second housing wall 123, which has the connecting element 117, is arranged relative to the first housing wall 122, on which the objective 113 is located, at a right angle β. In addition, the second housing wall 123 directly adjoins the first housing wall 122.

FIG. 5 shows a space 124 occupied by the camera 103 of the second embodiment inside the A-pillar 107. A dimension A3 of this space 124 in parallel to the line of sight (the optical axis 14 here) is less than a dimension A4 of this space 124 in parallel to the longitudinal direction L of the A-pillar 107.

Other features of the second embodiment are similar to the corresponding features of the first embodiment and the repeated description thereof is omitted here.

Figures 6, 7:
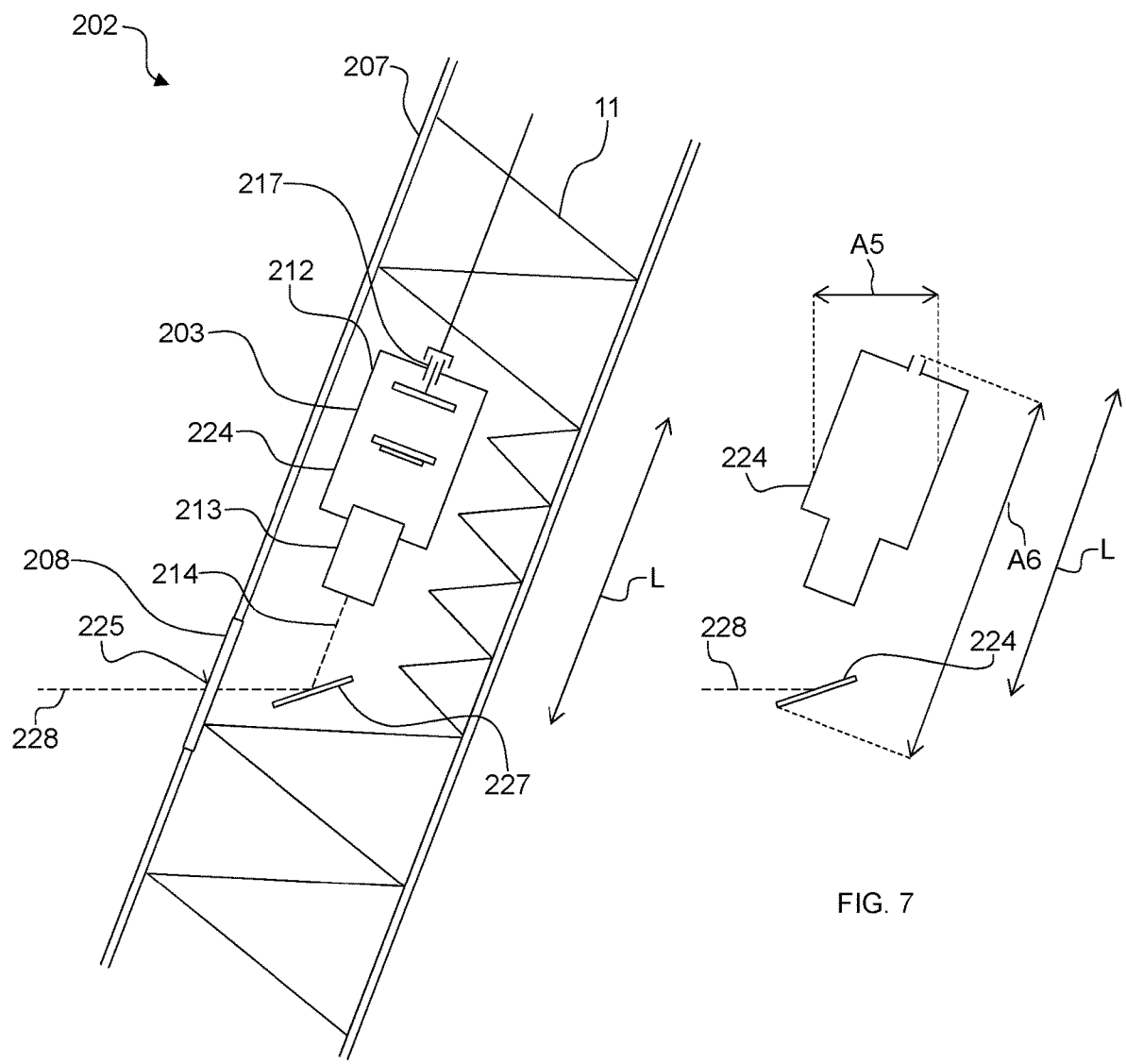
FIG. 6 shows a partial cross-sectional view of an A-pillar arrangement of the vehicle from FIG. 1 according to a third embodiment.
FIG. 7 illustrates a space occupied by a camera inside an A-pillar of the A-pillar arrangement from FIG. 6.

FIG. 6 shows an A-pillar arrangement 202 of the vehicle 1 from FIG. 1 according to a third embodiment. The A-pillar arrangement 202 of the third embodiment (FIGS. 6, 7) differs from the A-pillar arrangement 2 of the first embodiment (FIGS. 2, 3) in that the camera 203 has a deflection mirror 227 and due to a different alignment of the optical axis 214 of the camera 203.

An objective 213 of the camera 203 is arranged so that its optical axis 214 extends in parallel to the longitudinal direction L of the A-pillar 207. Even with a long objective 213, for example a telephoto lens, the camera 203 can thus be made small in relation to a diameter of the A-pillar 207 (i.e., in relation to a cross section of the A-pillar perpendicular to the longitudinal direction L of the A-pillar 207). To acquire objects in front of the vehicle 1 (for example the tree 4 in FIG. 1) by means of the camera 203, the camera 203 has the deflection mirror 227 arranged in front of the objective 213. The deflection mirror 227 is used to deflect a light beam incident from an object 4 in front of the vehicle 1 according to the line of sight 228 onto the objective 213. The deflection mirror 227 is arranged, for example, at an angle of 45° in relation to the optical axis 214 of the objective 213. The deflection mirror 227 is fastened, for example, by means of a holder (not shown) on the objective 213. Alternatively, the deflection mirror can also be fastened inside the A-pillar 207.

FIG. 7 shows a space 224 occupied by the camera 203 of the third embodiment inside the A-pillar 207. In this embodiment, the camera 203 is arranged completely inside the A-pillar 207 (FIG. 6). Therefore, the space 224 occupied by the camera 203 inside the A-pillar 207 is delimited by an enveloping shape, which jointly envelops the housing 212, the connecting element 217, the objective 213, the deflection mirror 227, and possibly a holder of the deflection mirror 227. As can be seen in FIG. 7, a dimension A5 of this space 224 in parallel to the line of sight 228 is less than a dimension A6 of this space 224 in parallel to the longitudinal direction L of the A-pillar 207.

The space 224 occupied by the camera 203 inside the A-pillar 207 can thus be kept small in relation to a cross section of the A-pillar 207 (i.e., in relation to a cross section of the A-pillar 207 perpendicular to the longitudinal direction L of the A-pillar 207), even if, for example, a longer objective (for example a telephoto lens) is used.

The A-pillar arrangement 202 of the third embodiment has a transparent cover 208. To clean an outer surface 225 of the transparent cover 208, the A-pillar arrangement 202 of the third embodiment can also have a cleaning device similar to the cleaning device 26 of the first and second embodiments.

Other features of the third embodiment are similar to the corresponding features of the first embodiment and the repeated description thereof will be omitted here.

Figure 9:
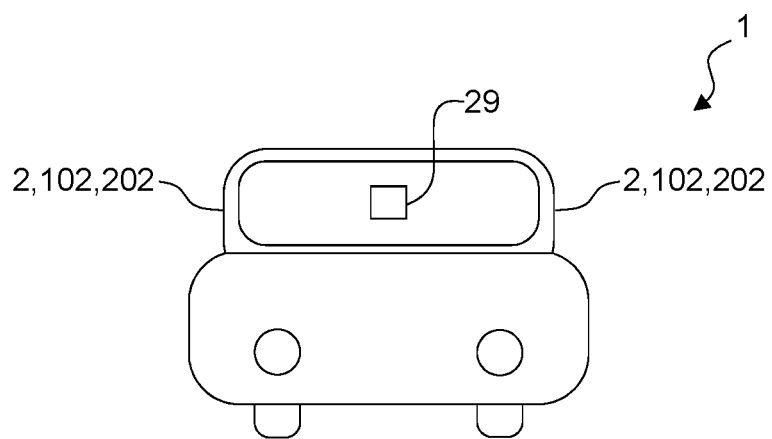
FIG. 9 shows a frontal view of a vehicle having two A-pillar arrangements Identical or functionally identical elements have been provided with the same reference signs in the figures, unless stated otherwise.

FIG. 9 shows a frontal view of a vehicle 1 having two A-pillar arrangements. The vehicle 1 is, for example, an autonomously or semi-autonomously driving vehicle. Each of the two A-pillar arrangements in FIG. 9 can be an A-pillar arrangement 2 according to the first embodiment (FIGS. 2, 3), an A-pillar arrangement 102 according to the second embodiment (FIGS. 4, 5), or an A-pillar arrangement 202 according to the third embodiment (FIGS. 6, 7).

The cameras 3, 103, 203 mounted inside the A-pillars 7, 107, 207 of the A-pillar arrangements 2, 102, 202 in FIG. 9 are each, for example, high-resolution cameras having a telephoto lens for monitoring a long range in front of the vehicle 1, in particular also centrally in front of the vehicle 1.

In addition, the vehicle 1 in FIG. 9 has a centrally mounted front camera 29 having a normal objective or a wide-angle objective for monitoring a close range in front of the vehicle 1, in particular also centrally in front of the vehicle 1. The centrally mounted front camera 29 is attached, for example, behind a windshield of the vehicle 1. The centrally mounted front camera 29 is, for example, a camera of moderate spatial resolution.

Because the vehicle 1 in FIG. 9 has both the two narrow-angle cameras installed in the A-pillars of the A-pillar arrangements 2, 102, 202 and the centrally mounted wide-angle or normal-angle camera 29, the surroundings in front of the vehicle 1 can be monitored by means of three cameras, both at long range and at close range.

Although the present invention has been described on the basis of exemplary embodiments, it may be modified in many ways.

LIST OF REFERENCE SIGNS 1 vehicle
2, 102, 202 A-pillar arrangement
3, 103, 203 camera
4 object
5 data line
6 control device
7, 107, 207 A-pillar
8, 208 transparent cover
9 outer structure
10 cavity
11 girder structure
12, 112, 212 housing
13, 113,213 objective
14, 114,214 optical axis
15 image sensor
16 circuit board
17, 117, 217 connecting element
18 connecting element
19 image processor
20 memory
21 control unit
22, 122 housing wall
23, 123 housing wall
24, 124, 224 space
25, 225 surface
26 cleaning device
227 deflection mirror
228 line of sight
29 camera
circuit board
A1-A6 dimension
L longitudinal direction

The invention claimed is:

1. A camera for a vehicle, comprising:
a housing;
an objective;
a first circuit board arranged in the housing;
an image sensor arranged on the first circuit board, wherein the main extension plane of the first circuit board is arranged perpendicular to an optical axis of the objective and the image sensor is located in the beam path of the objective;
a second circuit board, which is arranged in the housing and is electrically connected to the first circuit board, wherein the second circuit board is arranged behind the first circuit board with respect to the image sensor and offset upward in relation to the first circuit board relative to the optical axis of the objective; and
a connecting element which is attached to the housing and is configured for a connection of the camera to a vehicle-side connecting element,
wherein the camera is configured
to record image data of an area in front of the vehicle; and
to be mounted at least partially inside the A-pillar of the vehicle, such that the camera occupying a space comprising a first and a second dimensions, wherein the first dimension is parallel to a line of sight of the camera, and the second dimension is parallel to a longitudinal direction of an A-pillar of the vehicle in which the housing is installed, such that the first dimension is smaller than the second dimension.

2. The camera as claimed in claim 1, wherein the camera has a telephoto lens and is configured to record image data of a long range in front of the vehicle.

3. The camera as claimed in claim 1, wherein the camera is configured to be arranged in the A-pillar in such a way that an objective of the camera protrudes forward out of the A-pillar in the vehicle direction.

4. The camera as claimed in claim 1,
wherein the objective is arranged on a first housing wall,
wherein the camera-side connecting element is arranged on a second housing wall, and
wherein the second housing wall forms an angle with the first housing wall.

5. The camera as claimed in claim 1, wherein:
the camera is configured to be arranged in the A-pillar so that an optical axis of an objective of the camera is aligned along a longitudinal direction of the A-pillar,
the camera has a deflection mirror arranged in front of the objective, and
the deflection mirror is configured to deflect a light beam incident from an object in front of the vehicle onto the objective.

6. The camera as claimed in claim 1, wherein
the camera-side connecting element is configured to be connected to a vehicle-side connecting element, in order to transmit image data recorded by the camera to an image processor arranged outside the camera, to store image data recorded by the camera on a memory arranged outside the camera, to receive control commands of a control unit arranged outside the camera, and/or to supply the camera with power.

7. An A-pillar arrangement for a vehicle, comprising:
an A-pillar; and
the camera claimed in claim 1.

8. The A-pillar arrangement as claimed in claim 7, further comprising: a transparent cover, wherein the camera is configured to record images of an area in front of the vehicle through the transparent cover.

9. The A-pillar arrangement as claimed in claim 8, wherein the transparent cover has a low optical distortion.

10. The A-pillar arrangement as claimed in claim 8, wherein the transparent cover is dome-shaped.

11. The A-pillar arrangement as claimed in claim 8, wherein the transparent cover has an outer surface, and the A-pillar arrangement has a cleaning device for cleaning at least a part of the outer surface of the transparent cover.

12. A vehicle having at least one A-pillar arrangement as claimed in claim 7.

13. The vehicle as claimed in claim 12, comprising:
two A-pillar arrangements, wherein the cameras mounted inside the A-pillars each have a telephoto lens; and
a centrally mounted front camera having a normal objective or a wide-angle objective.

* * * * *